United States Patent
Nuss et al.

(10) Patent No.: US 10,238,233 B2
(45) Date of Patent: Mar. 26, 2019

(54) FILTRATION AND LIQUID LEVEL CONTROL SYSTEM

(71) Applicant: Haier US Appliance Solutions, Inc., Wilmington, DE (US)

(72) Inventors: Bart Andrew Nuss, Fisherville, KY (US); Alan Joseph Mitchell, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 48 days.

(21) Appl. No.: 15/351,498

(22) Filed: Nov. 15, 2016

(65) Prior Publication Data
US 2018/0132653 A1 May 17, 2018

(51) Int. Cl.
A47J 31/44 (2006.01)
A47J 31/46 (2006.01)
B67D 1/08 (2006.01)
B67D 1/00 (2006.01)

(52) U.S. Cl.
CPC .......... *A47J 31/4457* (2013.01); *A47J 31/46* (2013.01); *B67D 1/0009* (2013.01); *B67D 1/0871* (2013.01)

(58) Field of Classification Search
CPC ..... A47J 31/4457; A47J 31/46; B67D 1/0009; B67D 1/0871
See application file for complete search history.

(56) References Cited

U.S. PATENT DOCUMENTS

| | | | | |
|---|---|---|---|---|
| 5,063,836 | A * | 11/1991 | Patel | A47J 31/56 99/281 |
| 6,223,938 | B1 * | 5/2001 | Pare | B67D 1/0007 222/146.5 |
| 6,240,829 | B1 * | 6/2001 | McGarrah | A23F 3/163 222/129.4 |
| 7,228,066 | B2 * | 6/2007 | Pope | A47J 31/4475 392/441 |
| 7,503,253 | B2 * | 3/2009 | Rahn | A47J 31/106 426/433 |
| 7,597,215 | B2 * | 10/2009 | Sleiman | B67D 1/0009 141/198 |
| 7,773,866 | B2 * | 8/2010 | Goeckner | A47J 31/545 392/442 |
| 9,463,972 | B2 * | 10/2016 | Hitzelberger | B67D 7/78 |
| 9,468,332 | B2 * | 10/2016 | Mitchell | A47J 31/44 |
| 9,560,934 | B2 * | 2/2017 | Mitchell | A47J 31/56 |
| 9,603,482 | B2 * | 3/2017 | McHale | A47J 31/465 |
| 2008/0000357 | A1 * | 1/2008 | Yang | A47J 31/0684 99/279 |
| 2010/0107887 | A1 * | 5/2010 | Bentley | A47J 31/44 99/288 |
| 2011/0259913 | A1 * | 10/2011 | Yui | B67D 1/0004 222/66 |

(Continued)

FOREIGN PATENT DOCUMENTS

CN 105167604 A 12/2015

*Primary Examiner* — Frederick C Nicolas
(74) *Attorney, Agent, or Firm* — Dority & Manning, P.A.

(57) ABSTRACT

A control system for delivering filtered liquid to a reservoir of a beverage machine. The liquid level within the reservoir is monitored, and when the liquid level is at or below a predetermined level, a valve opens to allow liquid to flow to the reservoir. Once the liquid level has reached or obtained a predetermined liquid fill level, the valve is closed.

20 Claims, 4 Drawing Sheets

(56) References Cited

U.S. PATENT DOCUMENTS

2015/0004288 A1* 1/2015 McHale ................ A47J 31/465
  426/231
2016/0130131 A1 5/2016 Hitzelberger
2016/0338526 A1* 11/2016 Nuss ..................... A47J 31/462

* cited by examiner

001F1LTRATION AND LIQUID LEVEL
CONTROL SYSTEM

FIELD OF THE INVENTION

The present disclosure relates generally to control systems for beverage machines. More particularly, the present disclosure relates to a system that is adapted to deliver filtered liquid to a reservoir of a beverage machine.

BACKGROUND OF THE INVENTION

Certain beverage machines include reservoirs for storing various liquids, such as water. The liquid stored within the reservoir may be dispensed directly into a user's cup or used for making other liquids, such as coffee or tea. Beverage machines sometimes do not have direct access to a liquid source, especially machines that are designed to be placed on top of a countertop. Accordingly, many beverage machines have reservoirs that must be filled manually. Even where a beverage machine does have direct access to a liquid source the filling process is not automated. Certain users may conclude that the constant need to refill the beverage machine can be time consuming, tiresome, and laborious.

Generally, the quality of a beverage made from a beverage machine depends on the quality of the liquid source, as is the case with coffee for example. Many times the nearest liquid source is an undesirable or low quality liquid source, such as a tap water source. Liquid from a tap water source may contain a strong odor or taste and may include undesirable chemical elements, such as chlorine. Many beverage machines do not have filtration systems that service the reservoir. Indeed, users have few or no options for effective filters. Moreover, filtrations systems can be bulky and may take up valuable countertop space. Without an effective means for filtering the liquid supplied to the reservoir, users are forced to consume lower quality beverages. Nevertheless, even if a liquid source is filtered to some extent, filtration components are rarely maintained and replaced at appropriate intervals.

Accordingly, a system for filling and filtering liquid supplied to a beverage machine is needed. In particular, a system capable of automatically filling a reservoir of a beverage machine with a filtered liquid is desirable.

BRIEF DESCRIPTION OF THE INVENTION

Exemplary aspects of the present disclosure are directed to a control system for delivering filtered liquid to a reservoir of a beverage machine. More particularly, the liquid level within the reservoir is monitored, and when the liquid level is at or below a predetermined level, a valve opens to allow liquid to flow to the reservoir. Once the liquid level has reached or obtained a predetermined liquid fill level, the valve is closed. Other aspects and advantages of the invention will be set forth in part in the following description, or may be obvious from the description, or may be learned through practice of the invention.

One aspect of the present disclosure is directed to a control system for providing liquid from a liquid source to a beverage machine. The beverage machine includes a reservoir configured to hold a volume of liquid. The control system includes a valve, a liquid level sensor, and a controller. The valve is configured to selectively allow liquid to flow from a liquid source to the reservoir. The liquid level sensor is configured to detect a liquid level within the reservoir. The controller is in operative communication with the liquid level sensor and the valve, and configured to: receive a low liquid signal from the liquid level sensor when the liquid level within the reservoir has reached a predetermined low liquid level; send an open valve signal to the valve to open the valve to allow liquid to flow into the reservoir; receive a liquid fill signal from the liquid level sensor when the liquid level within the reservoir has reached a predetermined liquid fill level; and finally, send a close valve signal to the valve to close the valve to cease the flow of liquid into the reservoir.

In another exemplary aspect, the controller can optionally be in operative communication with the liquid level sensor and the valve wirelessly.

In another exemplary aspect, the control system can optionally include a filter positioned along a flowpath of the control system and between the liquid source and the valve such that filtered liquid can be provided to the reservoir.

Another exemplary aspect of the present disclosure is directed to a method for automatically providing liquid to a beverage machine. The method includes: monitoring a liquid level within the reservoir; detecting a predetermined low liquid level; opening a valve to provide a liquid flow to the reservoir; detecting a predetermined liquid fill level; and closing the valve.

In another exemplary aspect, the exemplary method may optionally include: filtering the liquid flow to the reservoir.

In yet another exemplary aspect, after opening the valve, the exemplary method optionally includes: monitoring a liquid quality level of the liquid flow; detecting a predetermined liquid quality level of the liquid flow; and closing the valve if the predetermined liquid quality level is reached or obtained.

Variations and modifications can be made to these exemplary aspects of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to the relative direction with respect to fluid flow in a fluid pathway. For example, "upstream" refers to the direction from which the fluid flows and "downstream" refers to the direction to which the fluid flows.

Figure 1:
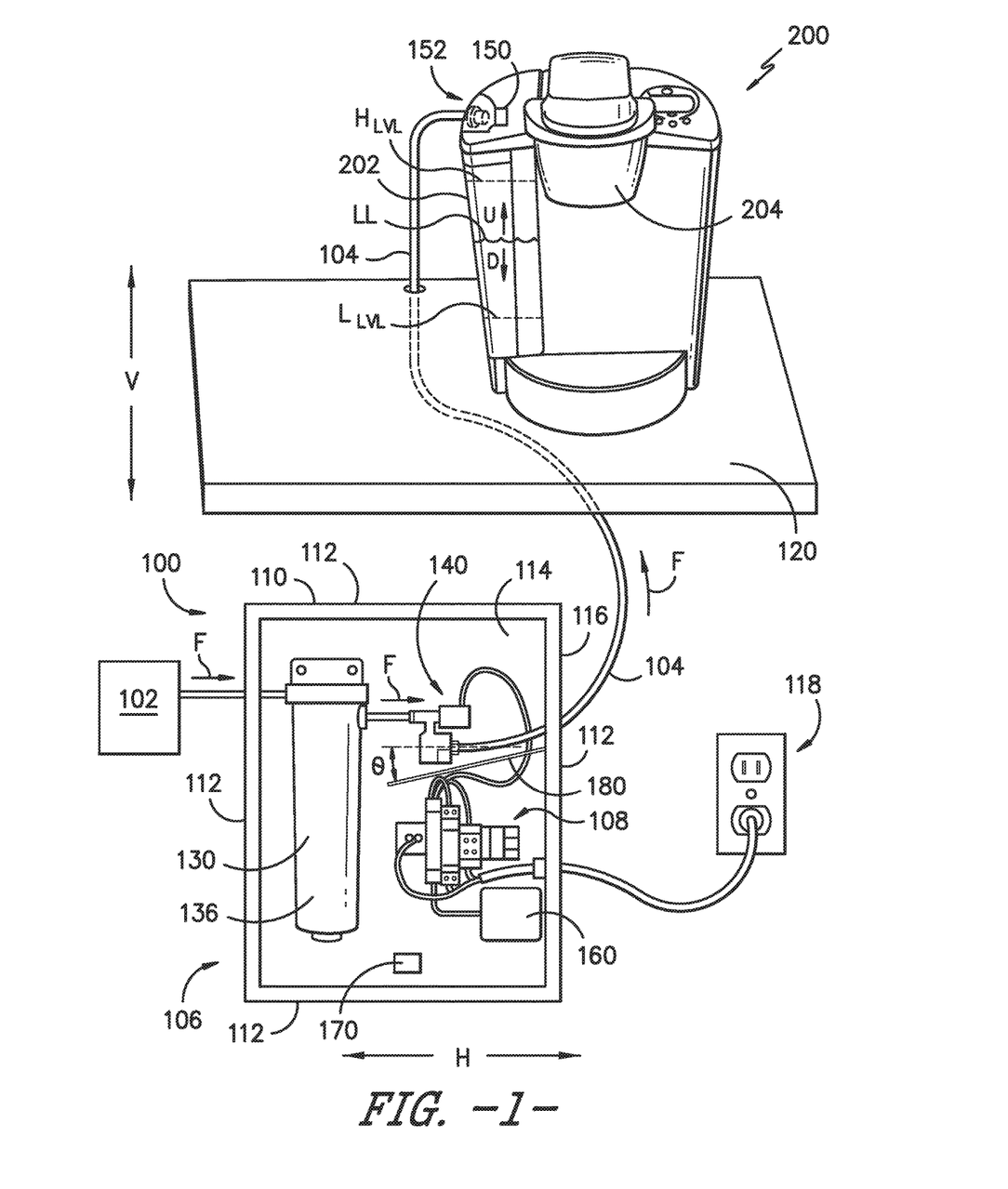
FIG. 1 is a front, perspective view of an exemplary control system operatively coupled with a beverage machine.

Turning now to the drawings, FIG. 1 is a perspective view of an exemplary control system 100 configured to provide filtered liquid to a beverage machine 200. More specifically, when a liquid level LL within a reservoir 202 of beverage machine 200 has reached a predetermined low liquid level $L_{LVL}$, control system 100 provides liquid to reservoir 202 until the liquid level LL within reservoir 202 has reached a predetermined liquid fill level $H_{LVL}$. In this manner, control system 100 provides a "continuous supply" of filtered liquid to beverage machine 200. In certain embodiments, reservoir 202 may be a tank or other container that is removable from beverage machine 200.

For this exemplary embodiment, control system 100 includes a filter 130, a valve 140, a liquid level sensor 150, and a controller 160, among other components. Filter 130, valve 140, and controller 160 are enclosed within a control unit 106, while liquid level sensor 150 is positioned proximate reservoir 202. Filter 130 filters the liquid flowing from a liquid source 102 to reservoir 202. Valve 140 selectively allows liquid to flow to reservoir 202. Liquid level sensor 150 senses and/or detects a liquid level LL of reservoir 202. It will be appreciated that the liquid level LL can move up or down as shown in FIG. 1 by the arrows U and D. As will be explained in greater detail herein, filter 130, valve 140, and liquid level sensor 150 are in operative communication with controller 160 and/or one another such that the process of filling reservoir 202 of beverage machine 200 is automated and filter 130 can be serviced as needed. Moreover, controller 160 is also in operative communication with a user interface device 300 (FIG. 3) so that a user can query controller 160 as to the status of the various components of control system 100 and beverage machine 200.

Controller 160 may include one or more processors, a memory, and a wireless transceiver (all not shown) and provides end user functionality. The processor(s) of controller 160 may be any suitable processing device, such as a microprocessor, microcontroller, integrated circuit, or other suitable processing device. The memory of controller 160 may include any suitable computing system or media, including, but not limited to, non-transitory computer-readable media, RAM, ROM, hard drives, flash drives, or other memory devices. The memory of controller 160 can store information accessible by processor(s) of controller 160, including instructions that can be executed by processor(s) of controller 160 in order to operate various components of control system 100 to provide end user functionality. Input/output ("I/O") signals may be routed between controller 160 and various operational components of control system 100. Controller 160 also includes a controller transceiver 162 (FIG. 3) for operative communication with various components of control system 100.

A flowpath F extends from liquid source 102 to reservoir 202 of beverage machine 200. In this exemplary embodiment, flowpath F includes, in a serial flow relationship, liquid source 102, filter 130, valve 140, and reservoir 202 of beverage machine 200. Liquid source 102 may be any suitable source of liquid, such as a tap water source (not shown) or a portable water tank (not shown). Where liquid source 102 is not a pressurized source or a greater flowrate of liquid to reservoir 202 is desired, a pump (not shown) may optionally be included to pump liquid along flowpath F to reservoir 202 of beverage machine 200. Such pump may be positioned anywhere along flowpath F. For example, the pump may be positioned at or adjacent liquid source 102. As another example, the pump may be positioned downstream of liquid source 102 and upstream of filter 130.

Filter 130 is positioned downstream of liquid source 102 and is housed in a filter manifold 136. Filter 130 may be any suitable type of filter. Preferably, filter 130 is capable of reducing or extracting impurities and contaminants from the liquid flowing along flowpath F, such as, for example, chlorine-resistant cysts, lead, mercury, sediment, and other unwanted materials. As illustrated, filter 130 is positioned upstream of valve 140 so that liquid entering valve 140 is filtered and absent of impurities and contaminants, which may better maintain the integrity and operational characteristics of valve 140. To ensure continuous proper filtration of the liquid flowing along flowpath F to reservoir 202, filter 130 is a replaceable filter in certain embodiments.

Although filter 130 is shown positioned downstream of liquid source 102 and upstream of valve 140, filter 130 may be positioned in other locations along flowpath F. For example, filter 130 may be positioned downstream of valve 140. In other exemplary embodiments of control system 100, filter 130 is optionally not included or positioned elsewhere along flowpath F.

Valve 140 may be any suitable type of valve capable of selectively allowing liquid to flow along flowpath F when such flow is desired. Valve 140 may be a solenoid-actuated check valve or a proportional valve, for example. As will be described in greater detail herein, valve 140 is configured to selectively allow a flow of liquid into reservoir 202 by opening and closing depending on the liquid level LL within reservoir 202 indicated by liquid level sensor 150.

Reservoir 202 of beverage machine 200 is located downstream of valve 140. A liquid supply conduit 104 provides a means for liquid to flow from valve 140 to reservoir 202. Reservoir 202 may be any suitable container or receptacle capable of holding a volume of liquid. Reservoir 202 may be fixedly attached to beverage machine 200 or reservoir 202 may be detachable from beverage machine 200.

Referring still to FIG. 1, a vertical direction V provides a frame of reference for orienting control system 100 with respect to beverage machine 200 for this exemplary embodiment. Beverage machine 200 is shown positioned on or atop of countertop 120 such that users may conveniently access beverage machine 200. A majority of the components of control system 100 (enclosed within control unit housing 110) are shown mounted beneath or under countertop 120. In this manner, control system 100 does not utilize countertop space, freeing up countertop 120 for other uses. As illustrated, control system 100 includes a remote control unit 106; meaning control unit 106 is positioned remotely with respect to beverage machine 200. In other exemplary embodiments, control unit 106 can be positioned adjacent to beverage machine 200.

As shown, certain components of control unit 106, such as valve 140, filter 130, controller 160, and an electrical assembly 108, are enclosed within control unit housing 110. Control unit housing 110 includes sidewalls 112 and an access door 114. Sidewalls 112 form the perimeter of control unit housing 110 and protect the various components of control unit 106 from debris, water, etc. Access door 114 is moveable between a closed position and an open position to provide access to the various components of control system 100. In this embodiment, access door 114 is transparent but an opaque door may be used as well.

A leak protection structure 180 extends from sidewall 112. Leak protection structure 180 separates electrical assembly 108 from valve 140, filter 130, and the portion of flowpath F traversing control unit 106. In this manner, leak protection structure 180 protects electrical assembly 108 from being damaged by liquid or condensate from flowpath F. In this embodiment, leak protection structure 180 is a shelf or wall that extends outwardly from a vertical sidewall 116 of control unit housing 110. More specifically, leak protection structure extends at an angle θ with respect to a horizontal direction H. In this embodiment, angle θ is about twenty degrees (20°) with respect to horizontal direction H. In other embodiments, angle θ may range between about five degrees (5°) to about seventy degrees (70°) with respect to horizontal direction H.

Referring still to FIG. 1, a power source 118 provides power to various components of control system 100. For instance, in FIG. 1, power source 118 is shown powering an electrical assembly 108, including controller 160. Power source 118 also provides power to valve 140 via electrical assembly 108. Liquid level sensor 150 and beverage machine 200 may also be powered by power source 118. Although power source 118 is a standard AC power supply in this embodiment, it should be understood that other power sources for powering the various devices are contemplated. For instance, the various components of control system 100 may be powered by batteries.

Beverage machine 200 may be any suitable type of beverage machine 200. For example, beverage machine 200 may be a "single serve beverage machine" configured to receive capsules or pods with flavorings therein that are brewed or mixed with hot or cold water to provide a hot or cold beverage. As an example, beverage machine 200 may be a KEURIG® brand single-cup coffee brewing system or a VERISMO™ brand single-cup coffee brewing system. However, control system 100 may be used with and/or configured to work with any suitable beverage machine, such as home, commercial, and/or office beverage dispensing systems. Thus, it should be understood that control system 100 may be used with any suitable beverage machine having a reservoir in alternative exemplary embodiments.

For this exemplary embodiment, beverage machine 200 includes a reservoir 202 and a dispenser 204 for dispensing liquid. Reservoir 202 is configured to store liquid such that the liquid may be readily available for use by a user. For example, the liquid could be dispensed directly from reservoir 202 into a user's cup or receptacle (not shown) or the stored liquid could be used or mixed to make a different liquid, such as coffee or tea. Dispenser 204 dispenses liquid into a user's receptacle (not shown). As such, a user may place his or her receptacle (not shown) within the docking station of beverage machine 200 and dispenser 204 dispenses liquid therein.

Figure 2:
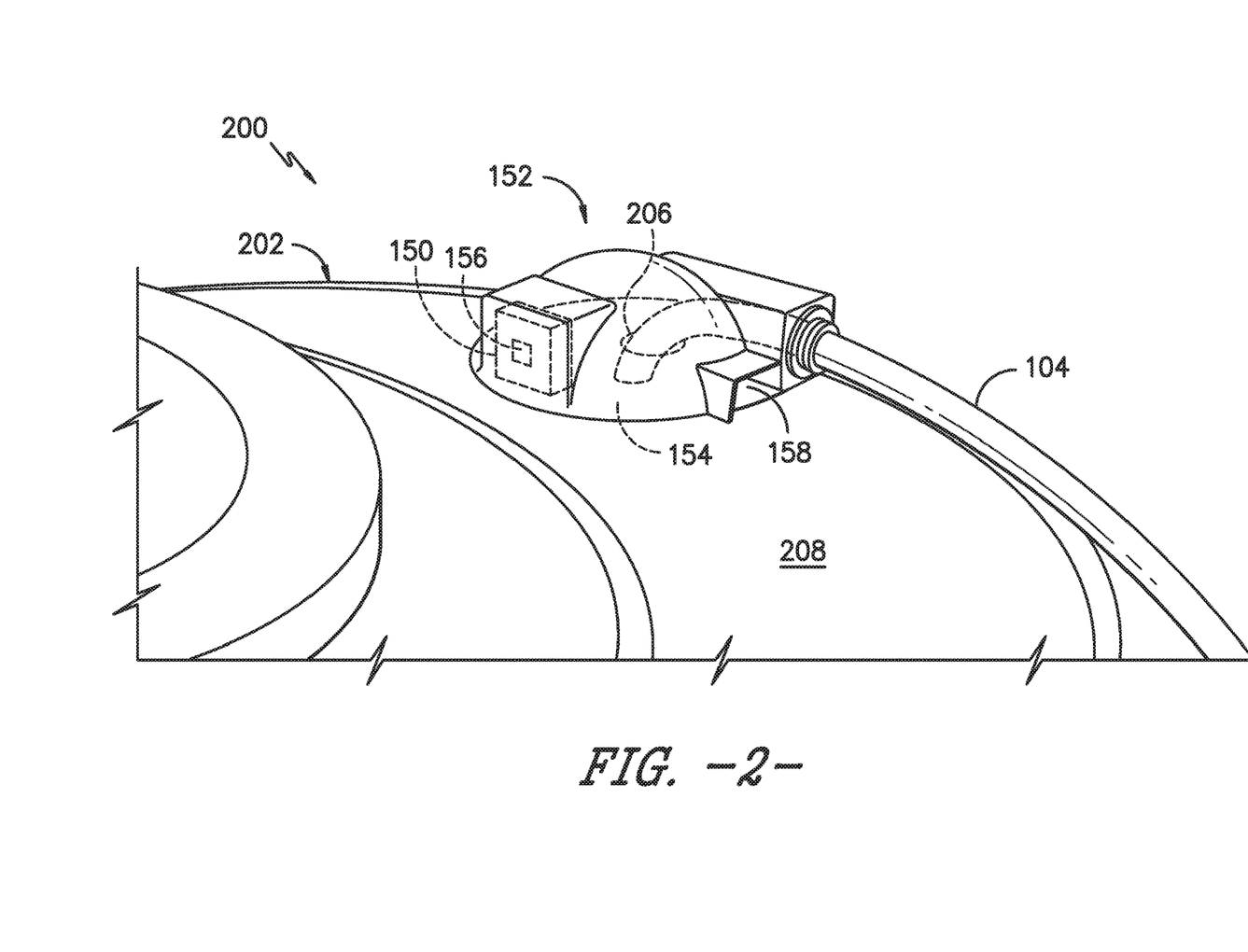
FIG. 2 is a close-up view of an exemplary reservoir interface.

FIG. 2 shows a close-up view of an exemplary reservoir interface 152 attached to an exemplary reservoir 202 of beverage machine 200. Reservoir interface 152 houses liquid level sensor 150 and may include an interface power source (not shown) (e.g., a battery) for powering liquid level sensor 150. Reservoir interface 152 includes an opening 158 that may permit electrical wiring and the like to be routed to liquid level sensor 150, among other possible uses. Reservoir interface 152 may also house a liquid level transceiver 156 that is configured to facilitate communication with other components of control system 100. Liquid level transceiver 156 may be integrated with liquid level sensor 150 or liquid level transceiver 156 may be a standalone component. Reservoir interface 152 also provides a secure attachment of liquid supply conduit 104 to reservoir 202. In particular, reservoir interface 152 holds liquid supply conduit 104 in place such that liquid supply conduit 104 is in communication with aperture 206 of reservoir 202.

Reservoir interface 152 includes an adhesive surface 154 (e.g., the bottom of the reservoir interface 152) configured to attach to reservoir surface 208 of reservoir 202. The geometry of the adhesive surface 154 is configured to be complementary to the reservoir surface 208 of reservoir 202. In this way, more surface area of adhesive surface 154 can be affixed to reservoir 202. Adhesive surface 154 could include various adhesives, such as synthetic adhesives or natural glue, for example. In addition, reservoir interface 152 may be affixed to reservoir 202 by other means, including by way of example, mechanical fasteners or suction cups.

In the exemplary embodiment shown in FIGS. 1 and 2, reservoir interface 152 includes liquid level sensor 150, as noted above. Liquid level sensor 150 is configured to assess a liquid level LL (e.g., the water level) within reservoir 202 of beverage machine 200. Thus, liquid level sensor 150 measures the level or height of liquid within reservoir 202 of beverage machine 200 and establish when the level or height of liquid within reservoir 202 of beverage machine 200 is at a predetermined low liquid level $L_{LVL}$, a predetermined liquid fill level $H_{LVL}$, or liquid level sensor 150 can report the current liquid level LL within reservoir 202. Liquid level sensor 150 can be positioned vertically above the liquid level LL in the top portion of reservoir 202 as shown in FIG. 1. In alternative embodiments, liquid level sensor 150 is positioned at, adjacent, within, and/or near reservoir 202 such that liquid level sensor 150 can detect the liquid level LL within reservoir 202.

Liquid level sensor 150 may be any suitable type of sensor. For example, liquid level sensor 150 may be any suitable one or combination of an optical sensor, an infrared sensor, an ultrasonic sensor, an acoustic sensor, a pressure sensor, etc. Liquid level sensor 150 may include a single sensor component (such as an acoustic sensor) or may include multiple sensor components (such as an acoustic sensor and a pressure sensor), respectively or in combination.

Figure 3:
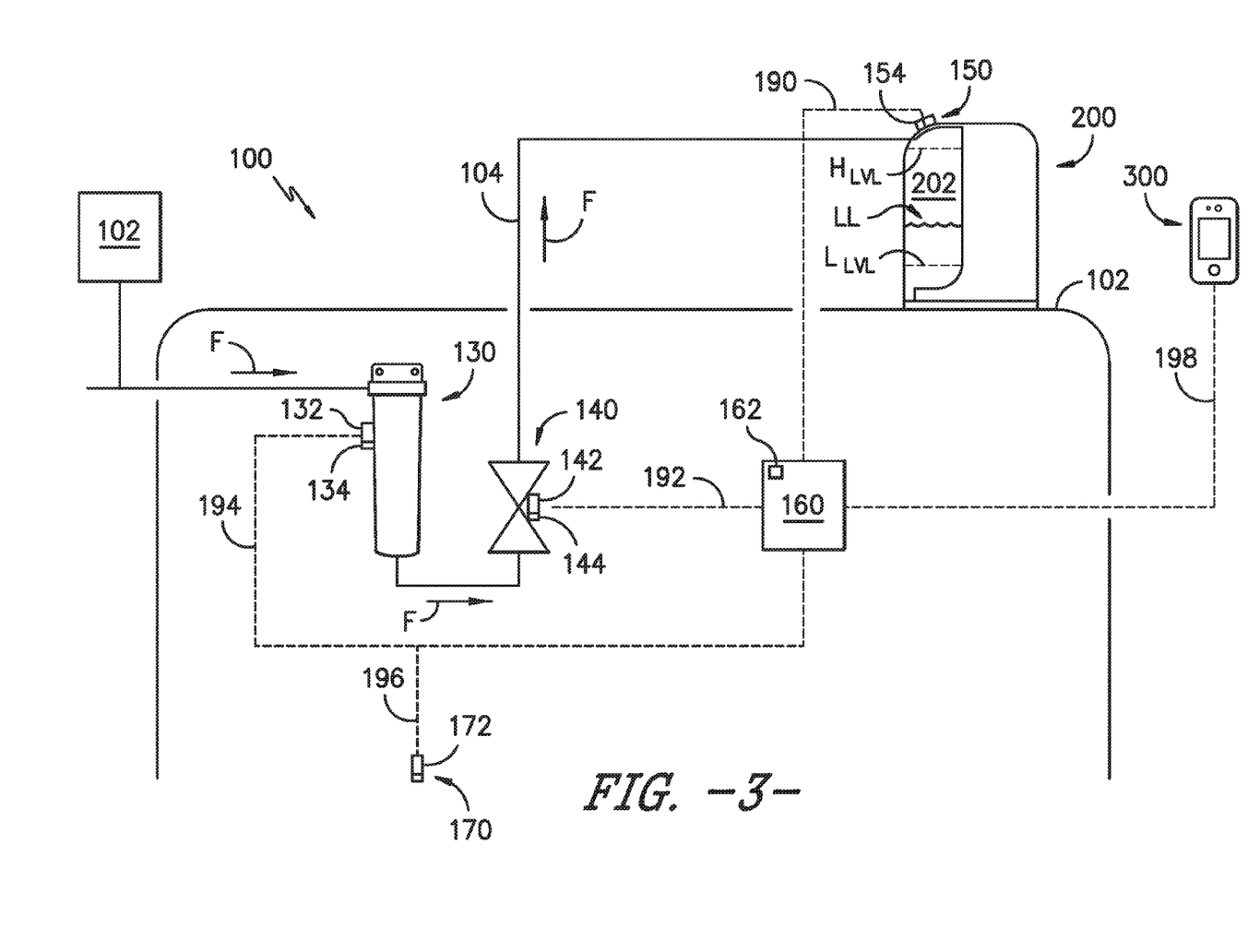
FIG. 3 is an exemplary schematic view illustrating exemplary operations of control system.

Referring now to FIG. 3, an exemplary schematic view is provided to illustrate exemplary operations of control system 100. More specifically, controller 160 is shown in operative communication (shown by the dashed communication lines 190, 192, 194, 196, and 198) with filter 130, valve 140, liquid level sensor 150, a user interface device 300, and a leak detection sensor 170. Controller 160 sends signals to these various components, receives signals from these various components, or both, so as to automatically provide filtered liquid to beverage machine 200.

In one exemplary embodiment, controller 160 is in operative communication with filter 130, valve 140, liquid level sensor 150, user interface device 300, and leak detection sensor 170 via wireless technology. Exemplary wireless technologies include: WiFi, Bluetooth Low Energy (BLE), Low Power Wide-Area Networks (LPWAN), and ZigBee networks. In the embodiment shown in FIG. 3, controller 160 is in operative communication with the noted components via a BLE network. Wireless capabilities provide flexibility to the positioning of the various components of control system 100 and reduce the need to route potentially unsightly and bulky wires across countertop 102 to beverage machine 200.

In alternative embodiments, controller 160 may be operative communication with the various components of control system 100 and beverage machine 200 via a wired network. In another alternative embodiment, controller 160 may be in operative communication with the various components of control system 100 and beverage machine 200 via a combination of wired and wireless network technologies.

Referring still to FIG. 3, the various communication lines 190, 192, 194, 196, 198 and the interaction between the components of the respective communication lines will be described in greater detail.

At communication line 190, controller 160 is in operative communication with liquid level sensor 150.

In this exemplary embodiment, liquid level sensor 150 is configured to send/receive signals from controller 160. Specifically, liquid level sensor 150 is configured to: send a liquid low signal when a predetermined low liquid level $L_{LVL}$ is present in reservoir 202; then, liquid level sensor 150 is configured to send a liquid fill level signal when a predetermined liquid fill level $H_{LVL}$ is present in reservoir 202. Moreover, liquid level sensor 150 is configured to send a liquid level signal to controller 160 as to the status of the liquid level LL present within reservoir 202 (i.e., a liquid level status) when a user sends a status query or at a predetermined time interval. Controller 160 is configured to send a liquid level status to user interface device 300 (e.g., a user interface integral with beverage machine 200 or a user's portable electronic device) in response to a liquid level status query.

In alternative exemplary embodiments, liquid level sensor 150 can be configured to send the named signals directly to valve 140 such that it may be opened and closed in accordance with liquid needs of reservoir 202 (i.e., if more liquid is needed, valve 140 is opened, and conversely, if no liquid is needed, valve 140 is closed). In addition, liquid level sensor 150 can be configured to communicate directly with a user interface 300 or other components of control system 100, such as valve 140.

At communication line 192, controller 160 is in operative communication with valve 140.

In this exemplary embodiment, valve 140 is configured to send/receive signals from controller 160. Specifically, valve 140 and controller 160 are configured to operatively communicate as follows: valve 140 can receive an open valve signal from controller 160 when a predetermined low liquid level $L_{LVL}$ is present in reservoir 202 (as indicated by liquid level sensor 150); valve 140 can then send a valve position signal to controller 160 such that the valve's actual position is known and to confirm that valve 140 is in an open valve position; valve 140 can then receive a close valve signal from controller 160 when a predetermined liquid fill level $H_{LVL}$ has been reached in reservoir 202 (as indicated by liquid level sensor 150); then, valve 140 can send another or a second valve position signal to controller 160 to confirm that valve 140 is in a closed position. In this manner, valve 140 selectively allows liquid to flow to reservoir 202. Valve 140 may send other signals to controller 160, such as a flowrate signal corresponding to the flowrate of liquid through valve 140. Flowrate signal may assist in determining when filter 130 should be replaced and can help track the number of beverages made by beverage machine 200, for example.

Valve 140 includes a valve sensor 142 configured to detect the positioning of valve 140 and the flowrate through valve 140. To facilitate wireless communication between valve 140 (and valve sensor 142), valve 140 (and/or valve sensor 142) may include a valve transceiver 144 configured to send and receive signals to controller 160 wirelessly. Valve transceiver 144 may be integral with valve sensor 142 or valve transceiver 144 may be a separate, standalone component.

In alternative exemplary embodiments, valve 140 can be configured to send/receive the named signals directly with liquid level sensor 150 and/or user interface device 300.

At communication line 194, controller 160 is in operative communication with filter 130.

In this exemplary embodiment, filter 130 is configured to filter out various impurities and contaminants from the liquid being supplied to reservoir 202. Filter 130 includes a filter sensor 132 configured to detect when filter 130 has reached a predetermined filter level. Controller 160 is in operative communication with filter 130 such that controller 160 can send a filter level alert to a user when a predetermined filter level has been reached. As an example, if the flowrate of liquid through filter 130 has decreased to a certain rate or if the pores of the filter media have become clogged with debris, filter 130 may send a filter level signal to controller 160 indicating that filter 130 is in need of repair or replacement. The controller 160 may then send a filter level alert to a user interface device 300 or any other designated node. As another example, controller 160 may keep track of a time interval since filter 130 was last replaced and signal to controller 160 and ultimately a user when the time interval exceeds a replacement time interval, e.g., six months. As another example, controller 160 may record the volume of liquid that flows through filter 130 and notify a user when the volume of liquid exceeds a predetermined life span of filter 130.

To facilitate wireless communication between filter sensor 132 and controller 160, filter sensor 132 may include a filter transceiver 134 configured to send and receive signals to/from controller 160. Alternatively, filter transceiver 134 need not be a component of filter sensor 132 and may be a standalone component configured to send/receive signals from filter sensor 132 and controller 160.

In one exemplary embodiment, filter sensor 132 is configured to detect the liquid quality of the liquid flowing along flowpath F. When the liquid flowing along flowpath F has reached a predetermined liquid quality level, filter sensor 132 (or filter transceiver 134) sends a liquid quality signal to controller 160. Controller 160 can then send a liquid quality alert to a user interface device 300, such as a user's portable electronic device. If filter sensor 132 detects that the liquid flowing along flowpath F has reached a predetermined liquid quality level, controller 160 is configured to close valve 140 to prevent contaminated liquid from flowing to reservoir 202. Preferably, filter sensor 132 is any suitable sensor capable of detecting a plurality of liquid quality parameters, including but not limited to, for example: pH level, conductivity (salinity), dissolved oxygen, hardness, metals, harmful chemicals, turbidity, temperature, pathogens, and other harmful constituents, including the total coliform group. Control system 100 may include one or more filters 130 for removing impurities and contaminants from the liquid flowing along flowpath F.

In alternative exemplary embodiments, filter 130 (or filter sensor 132) can be configured to send/receive the named signals and alerts directly with liquid level sensor 150, valve 140, and/or user interface device 300.

At communication line 196, controller 160 is in operative communication with leak detection sensor 170.

In this exemplary embodiment, leak detection sensor 170 is configured to send/receive signals from controller 160. In particular, leak detection sensor 170 and controller 160 are configured to operatively communicate as follows: in the event leak detection sensor 170 senses that a leak along flowpath F has occurred within control unit housing 110 or generally along flowpath F, leak detection sensor 170 sends a leak signal to controller 160. Controller 160 then sends a leak alert to a user interface device 300 in response to the leak signal. Additionally, a user may query controller 160 as to whether any leaks have been detected over a given time period and a leak status or leak status report can be transmitted to the user via user interface device 300.

In alternative exemplary embodiments, leak detection sensor 170 can be configured to send/receive the named signals and alerts directly with valve 140, liquid level sensor 150, and/or user interface device 300.

At communication line 198, controller 160 is in operative communication with user interface device 300.

In this exemplary embodiment, user interface device 300 is configured to send/receive signals to/from controller 160. In particular, user interface device 300 is configured to send status query signals to controller 160. The status query signal could correspond to the status of one or more components of control system 100 and/or beverage machine 200, including a liquid level status of reservoir 202, a filter level status of filter 130, and a liquid quality status of the liquid flowing along flowpath F detected by filter sensor 132.

In response to the status query signal, controller 160 sends and user interface device 300 receives the status of the various components of control system 100 and beverage machine 200. User interface device 300 is configured to receive a liquid level status of reservoir 202, a filter level status of filter 130, a liquid quality status of the liquid flowing along flowpath F, a usage history status of beverage machine 200, a power cycle history status of beverage machine 200, and a beverages made status of beverage machine 200, for example. Additionally, user interface device 300 is configured to receive alerts from controller 160 that correspond to notifications sent to controller 160 by one or more of the components of control system 100. For example, user interface device 300 can receive a filter level alert when filter sensor 132 of filter 130 has detected a predetermined filter level; user interface device 300 can receive a liquid quality alert when filter sensor 132 of filter 130 has detected a predetermined liquid quality of the liquid flowing along flowpath F; and user interface device 300 can receive a leak alert when a leak is detected in control unit housing 110, for example.

Figure 4:
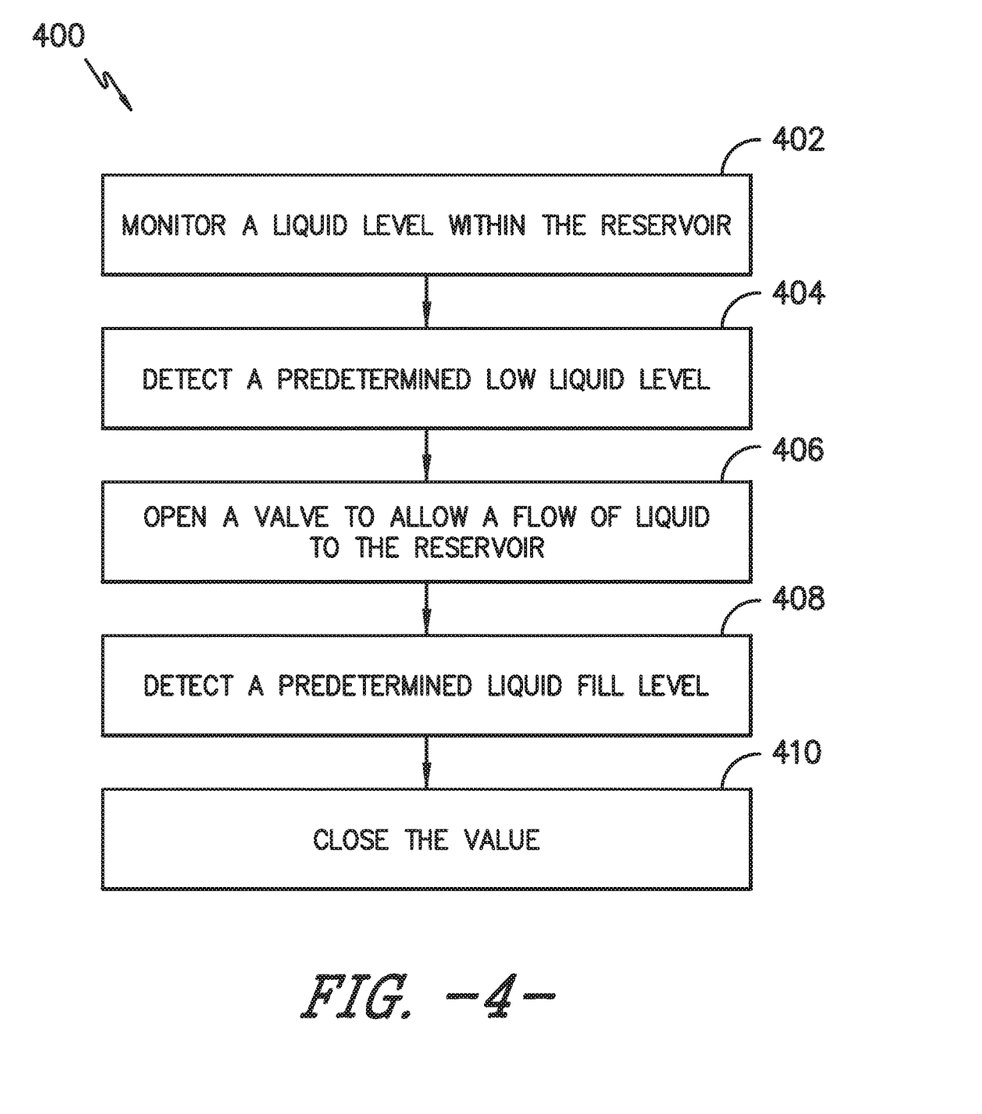
FIG. 4 is a flow chart detailing exemplary operations of an exemplary control system.

FIG. 4 illustrates an exemplary method 400 for automatically providing liquid to a beverage machine 200 in accordance with the embodiments disclosed herein. In particular, FIG. 4 is a flow chart illustrating exemplary method 400. The method 400 is described below in the context of control system 100. Nevertheless, method 400 may be used with other control systems and beverage machines.

At 402, liquid level sensor 150 monitors the liquid level LL within reservoir 202. Liquid level sensor 150 can be configured to monitor the liquid level LL of reservoir 202 periodically, continuously, or by way of command by user interface device 300, or a combination thereof, for example. As noted above, liquid level sensor 150 can send the sensed liquid level LL to controller 160, directly to valve 140, or directly to user interface device 300.

At 404, liquid level sensor 150 detects a predetermined low liquid level $L_{LVL}$ within reservoir 202. The predetermined low liquid level $L_{LVL}$ can be a default setting that may be adjusted by a user. By way of example, the predetermined low liquid level $L_{LVL}$ could correspond to a liquid level LL in which the reservoir 202 is half-full, a quarter full, etc. Once the predetermined low liquid level $L_{LVL}$ is detected, a signal may be sent to controller 160, valve 140, or user interface device 300.

At 406, valve 140 is opened to allow a liquid flow to reservoir 202. When instructed to open, valve 140 can be opened fully or partially, depending on the desired flowrate and the setting of predetermined low liquid level $L_{LVL}$, for example. In particular, if the predetermined low liquid level $L_{LVL}$ is a setting in which reservoir 202 is three-quarters full of liquid, valve 140 can be instructed to open only partially so that reservoir 202 is filled at a slower flowrate. Predetermined low liquid level $L_{LVL}$ may be a setting that is adjustable by a user. For example, a user may set the predetermined low liquid level $L_{LVL}$ to a level that corresponds to reservoir 202 being one-fifth full, one-quarter full, half-full, or any other suitable level. A user may adjust the predetermined low liquid level $L_{LVL}$ by using user interface device 300.

At 408, liquid level sensor 150 detects that a predetermined liquid fill level $H_{LVL}$ has been reached in reservoir 202. Once the predetermined liquid fill level $H_{LVL}$ is detected, a signal may be sent to controller 160, valve 140, or user interface device 300 to close valve 140. Predetermined liquid fill level $H_{LVL}$ may be a setting that is adjustable by a user. For example, a user may set the predetermined liquid fill level $H_{LVL}$ to a level that corresponds to reservoir 202 being four-fifths full, three-quarters full, half-full, or any other suitable level. A user may adjust the predetermined liquid fill level $H_{LVL}$ by using user interface device 300.

At 410, valve 140 is closed to cease the liquid flow to reservoir 202. Valve 140 may be configured to ease to a closed position such that liquid hammer (e.g., water hammer) does not occur (i.e., a knocking noise caused by a sudden liquid momentum change). When valve 140 is closed and the liquid fill level $H_{LVL}$ has been reached, users may use beverage machine 200 with a full supply of liquid within reservoir 202.

Method 400 may be repeated as many times as necessary. In other words, method 400 may be a loop. In this way, when users deplete the liquid supply within reservoir 202, control system 100 may automatically refill reservoir 202 as needed.

Method 400 may further include: filtering the liquid or liquid flow supplied to reservoir 202. In this way, the liquid provided to reservoir 202 may be filtered. Liquid may be filtered prior to opening valve 140 so as to provide filtered liquid immediately upon opening valve 140, for example. However, filtering the liquid can be done at any point in method 400.

Additionally, method 400 may further include: monitoring a liquid quality level of the liquid flow being provided to reservoir 202; detecting a predetermined liquid quality level of the liquid flow; and closing valve 140 if the predetermined liquid quality level is reached or obtained. When a predetermined liquid quality level is detected, valve 140 can be configured to close immediately. Moreover, controller 160 or filter sensor 132 can send a liquid quality alert to a user interface device 300.

Furthermore, method 400 may also include: detecting a predetermined filter level of filter 130. And if the predetermined filter level is reached or obtained, method 400 may further include closing valve 140 and/or sending an alert signal to controller 160 to route the signal or alert to a user, or alternatively, filter sensor 132 can send the alert or signal directly to user interface 300.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control system for providing liquid from a liquid source to a beverage machine, the beverage machine including a reservoir configured to hold a volume of liquid, the control system comprising:
   a valve configured to selectively allow liquid to flow from the liquid source to the reservoir, wherein the valve comprises a valve transceiver;
   a liquid level sensor configured to detect a liquid level within the reservoir, wherein the liquid level sensor comprises a liquid level transceiver; and
   a controller in operative communication with the liquid level transceiver of the liquid level sensor and the valve transceiver of the valve wirelessly, the controller configured to:
      receive a low liquid signal from the liquid level sensor when the liquid level within the reservoir has reached a predetermined low liquid level;
      send an open valve signal to the valve to open the valve to allow liquid to flow into the reservoir;
      receive a liquid fill signal from the liquid level sensor when the liquid level within the reservoir has reached a predetermined liquid fill level; and
      send a close valve signal to the valve to close the valve stop the flow of liquid to the reservoir.

2. The control system of claim 1, wherein a filter is positioned between the liquid source and the valve.

3. The control system of claim 2, wherein the filter comprises a filter sensor and wherein the controller is in operative communication with the filter sensor, the controller further configured to:
   receive a filter level signal from the filter sensor when a filter level of the filter has reached a predetermined filter level; and
   send a filter level alert.

4. The control system of claim 3, wherein the filter level alert is capable of being sent to at least one of a user interface device disposed on the beverage machine and a portable electronic device.

5. The control system of claim 2, wherein the filter sensor comprises a filter transceiver, the controller in operative communication with the filter transceiver wirelessly.

6. The control system of claim 1, wherein the controller is further configured to:
   receive a status query from a user;
   send a status signal to the user based on the status query.

7. The control system of claim 6, wherein the status signal corresponds to at least one of a filter level status and a liquid level status.

8. The control system of claim 6, wherein the status signal corresponds to at least one of a beverages made status, a usage history status, and a power cycle history status.

9. The control system of claim 1, wherein the liquid level sensor is at least one of an optical sensor, an infrared sensor, an ultrasonic sensor, an acoustic sensor, and a pressure sensor.

10. The control system of claim 2, wherein the control system further comprises:
    a control unit comprising the filter, the valve, and the controller;
    a control unit housing having sidewalls and an access wall and configured to encase the control unit; and
    a leak protection structure extending from at least one of the sidewalls or the access wall and separating the controller from the valve and the filter.

11. The control system of claim 10, wherein the control system further comprises a leak detection sensor positioned within the control unit housing for detecting leaks.

12. The control system of claim 1, further comprising:
    a filter positioned between the liquid source and the valve, wherein the filter comprises a filter sensor configured to detect a liquid quality level of liquid flowing to the reservoir, the controller further configured to:
       receive a liquid quality signal from the filter sensor when the liquid flowing to the reservoir has reached a predetermined liquid quality.

13. A control system for providing liquid from a liquid source to a beverage machine, the beverage machine including a reservoir configured to hold a volume of liquid, the control system comprising:
    a valve configured to selectively allow liquid to flow from the liquid source to the reservoir;
    a filter positioned between the liquid source and the valve, wherein the filter comprises a filter sensor;
    a liquid level sensor configured to detect a liquid level within the reservoir; and
    a controller in operative communication with the filter sensor, the liquid level sensor, and the valve, the controller configured to:
       receive a low liquid signal from the liquid level sensor when the liquid level within the reservoir has reached a predetermined low liquid level;
       send an open valve signal to the valve to open the valve to allow liquid to flow into the reservoir;
       receive a liquid fill signal from the liquid level sensor when the liquid level within the reservoir has reached a predetermined liquid fill level; and
       send a close valve signal to the valve to close the valve stop the flow of liquid to the reservoir, and
    wherein the controller is further configured to:
       receive a filter level signal from the filter sensor when a filter level of the filter has reached a predetermined filter level; and
       send a filter level alert.

14. The control system of claim 13, wherein the filter level alert is capable of being sent to at least one of a user interface device disposed on the beverage machine and a portable electronic device.

15. The control system of claim 13, wherein the filter sensor comprises a filter transceiver, the controller in operative communication with the filter transceiver wirelessly.

16. A control system for providing liquid from a liquid source to a beverage machine, the beverage machine including a reservoir configured to hold a volume of liquid, the control system comprising:

a valve configured to selectively allow liquid to flow from the liquid source to the reservoir;

a filter positioned between the liquid source and the valve, wherein the filter comprises a filter sensor configured to detect a liquid quality level of liquid flowing to the reservoir;

a liquid level sensor configured to detect a liquid level within the reservoir; and a controller in operative communication with the filter sensor, the liquid level sensor, and the valve, the controller configured to:
receive a low liquid signal from the liquid level sensor when the liquid level within the reservoir has reached a predetermined low liquid level;
send an open valve signal to the valve to open the valve to allow liquid to flow into the reservoir;
receive a liquid fill signal from the liquid level sensor when the liquid level within the reservoir has reached a predetermined liquid fill level; and
send a close valve signal to the valve to close the valve stop the flow of liquid to the reservoir, and wherein the controller is further configured to:
receive a filter level signal from the filter sensor when a filter level of the filter has reached a predetermined filter level; and
send a filter level alert, and wherein the controller is further configured to:
receive a liquid quality signal from the filter sensor when the liquid flowing to the reservoir has reached a predetermined liquid quality.

17. The control system of claim 16, further comprising:
a control unit comprising the filter, the valve, and the controller;
a control unit housing having sidewalls and an access wall and configured to encase the control unit; and
a leak protection structure extending from at least one of the sidewalls or the access wall and separating the controller from the valve and the filter.

18. The control system of claim 16, wherein the control system further comprises a leak detection sensor positioned within the control unit housing for detecting leaks.

19. The control system of claim 16, wherein the filter comprises a filter sensor and wherein the controller is in operative communication with the filter sensor, the controller further configured to:
receive a filter level signal from the filter sensor when a filter level of the filter has reached a predetermined filter level; and
send a filter level alert.

20. The control system of claim 16, wherein the filter sensor comprises a filter transceiver, the controller in operative communication with the filter transceiver wirelessly.

* * * * *